(12) United States Patent
Goergen

(10) Patent No.: US 9,750,013 B2
(45) Date of Patent: Aug. 29, 2017

(54) DUTY-CYCLE CONTROL IN WIRELESS NETWORK

(71) Applicant: PHILIPS LIGHTING HOLDING B.V., Eindhoven (NL)

(72) Inventor: Daniel Martin Goergen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 249 days.

(21) Appl. No.: 14/396,816

(22) PCT Filed: Apr. 22, 2013

(86) PCT No.: PCT/IB2013/053168
§ 371 (c)(1),
(2) Date: Oct. 24, 2014

(87) PCT Pub. No.: WO2013/160818
PCT Pub. Date: Oct. 31, 2013

(65) Prior Publication Data
US 2015/0078350 A1 Mar. 19, 2015

Related U.S. Application Data

(60) Provisional application No. 61/639,166, filed on Apr. 27, 2012.

(51) Int. Cl.
*H04W 72/04* (2009.01)
*H04W 28/18* (2009.01)

(52) U.S. Cl.
CPC ....... *H04W 72/0446* (2013.01); *H04W 28/18* (2013.01)

(58) Field of Classification Search
None
See application file for complete search history.

(56) References Cited

U.S. PATENT DOCUMENTS 7,126,913 B1 10/2006 Patel
2002/0167930 A1 11/2002 Pearl
(Continued)

FOREIGN PATENT DOCUMENTS

EP 2088829 A2 8/2009
JP 2009188927 A 8/2009
(Continued)

*Primary Examiner* — Christopher Crutchfield
*Assistant Examiner* — Alan Lindenbaum

(57) ABSTRACT

A wireless network has a duty-cycle limitation, which defines a total transmission time budget and an average transmission time. A device (100) has a controller (102) for controlling the transmission of data according to the duty-cycle limitation. The controller stores past transmission time usage of the device in sequences of buckets, and determines a bucket budget of transmission time. A basic transmission time budget is assigned which is smaller than the average transmission time of the corresponding time interval, and additional transmission time is allocated to allow for temporally exceeding the average transmission time. The additional transmission time is based on the total transmission time budget and the past transmission time usage of past buckets in combination with the future basic transmission time budget of future buckets, which past, current and future buckets together cover the duty-cycle period. Advantageously, the system enables accommodating temporal fluctuation in data transmission and guarantees a minimum transmission capacity.

15 Claims, 3 Drawing Sheets

(56) References Cited

U.S. PATENT DOCUMENTS

| | | |
|---|---|---|
| 2003/0228875 A1 | 12/2003 | Alapuranen |
| 2006/0067245 A1* | 3/2006 | Pearl .................. H04B 1/036 |
| | | 370/252 |
| 2006/0203795 A1 | 9/2006 | Welborn |
| 2008/0053207 A1 | 3/2008 | Burgan |
| 2011/0116373 A1 | 5/2011 | Lauer |

FOREIGN PATENT DOCUMENTS

| | | | |
|---|---|---|---|
| NL | WO 2010024665 A1 * | 3/2010 | ............. G08C 17/02 |
| WO | 2010024665 A1 | 3/2010 | |

* cited by examiner

DUTY-CYCLE CONTROL IN WIRELESS NETWORK

CROSS-REFERENCE TO PRIOR APPLICATIONS

This application is the U.S. National Phase application under 35 U.S.C. §371 of International Application No. PCT/IB2013/053168, filed on Apr. 22, 2013, which claims the benefit of U.S. Provisional Patent Application No. 61/639,166, filed on Apr. 27, 2012. These applications are hereby incorporated by reference herein.

FIELD OF THE INVENTION

The invention relates to a device for a wireless network, the network having a duty-cycle limitation requiring that the device is transmitting less than a predefined fraction of a predefined duty-cycle period, which fraction defines a total transmission time budget of the duty-cycle period. The device comprises an input for receiving data to be transferred, an output for transmitting data to the network and a controller for controlling the transmission of data according to the duty-cycle limitation.

The invention further relates to a method of determining transmissions in a wireless network, and a computer program for determining transmissions in a wireless network.

BACKGROUND OF THE INVENTION

The document US 2006/0067245 describes an adaptive duty-cycle management method and system for radio transmitters. A wireless device has a transmitter which transmits packets in the form of individual packets and/or packet bursts. A controller in combination with an instruction set limits the number of packets transmitted during each time period defined by one time window or adjacent time windows, on a sliding basis, so as to control the duty-cycle of transmissions during successive adjacent time windows, based on the transmitter's output power, to produce that average power output. The transmission of packets is thereby delayed as needed to establish sufficient, i.e. one or more, idle periods during one time window or adjacent time windows to apply whatever duty-cycle is needed to produce that average power output level limit for the transmitter. A counter is used for keeping a running count which may be correlated with the duty-cycle over one or more time windows. The counter is increased when a packet is transmitted, and decreased during idle time.

SUMMARY OF THE INVENTION

In the known adaptive duty-cycle system, a burst packet may be transmitted if the running count allows so. However, after sending a burst, further transmitting of packets may be blocked.

It is an object of the invention to provide a duty-cycle control which avoids blocking, while still enabling sending, a burst of data.

For this purpose, a device and method are provided as defined in the appended claims. In the system provided, the fraction further defines an average transmission time for an interval in the duty-cycle period as proportionally allowed by the duty-cycle limitation in the respective time interval.

In the network device as described in the opening paragraph, the controller is arranged for storing past transmission time usage of the device in a sequence of buckets, each bucket representing a respective time interval in a sequence of consecutive, adjacent time intervals, the intervals being smaller than the duty-cycle period, and determining a bucket budget of transmission time by assigning to the bucket budget a basic transmission time budget smaller than the average transmission time of the corresponding time interval, and assigning additional transmission time to a current bucket budget to allow for temporally exceeding the average transmission time of the respective time interval for accommodating temporal fluctuation in data transmission and determining the additional transmission time, based on the total transmission time budget and the past transmission time usage of past buckets in combination with the future basic transmission time budget of future buckets, which past, current and future buckets together cover the duty-cycle period.

The method as described in the opening paragraph comprises storing past transmission time usage of a device in the network in a sequence of buckets, each bucket representing a respective time interval in a sequence of consecutive, adjacent time intervals, the intervals being smaller than the duty-cycle period, and determining a bucket budget of transmission time by assigning to the bucket budget a basic transmission time budget smaller than the average transmission time of the corresponding time interval, and assigning additional transmission time to a current bucket budget to allow for temporally exceeding the average transmission time of the respective time interval for accommodating temporal fluctuation in data transmission and determining the additional transmission time, based on the total transmission time budget and the past transmission time usage of past buckets in combination with the future basic transmission time budget of future buckets, which past, current and future buckets together cover the duty-cycle period.

The bucket is, in practice, a register or a computer implemented memory location containing an amount of transmission time used in a time period. The history of past used transmission time in the sequence of periods is stored in any suitable way, e.g. a list, stack of registers, cyclic buffer, etc. Each of such sets of storage locations is called a bucket. The measures have the effect that the transmission time of the device is controlled according to the duty-cycle limitation. By assigning the bucket budget to the respective buckets as defined, the total transmission time given by the duty-cycle limitation is not exceeded in the specified duty-cycle period. Also, there is always a guaranteed minimum budget available to create a new bucket by assigning the basic transmission budget. Finally, a budget for a bucket can exceed the allowed average transmission time given by the duty-cycle limitation by assigning the additional transmission time. The additional transmission time is determined taking into account both past usage and possible future usage as minimally defined by said basic transmission time budget. Advantageously, the device and method effectively use the available transmission budget by enabling peaks while at the same time guaranteeing said basic transmission time budget for future time periods.

Optionally, the controller is arranged for determining the additional transmission time of the current bucket, based additionally on an additional upper limit, the upper limit being less than a total excess time budget defined by subtracting from the total transmission time budget a sum of the basic budgets of the number of buckets in the sequence, which sequence covers the duty-cycle period, the upper limit enabling assigning additional transmission time to multiple buckets in a duty-cycle period. This has the advantage that the excess time budget cannot be fully used within a single bucket time period. Hence, a peak in transmission will not block all further transmissions that exceed the basic transmission time budget.

Optionally, the controller is arranged for spreading the transmission within the current bucket by delaying a requested transmission within the corresponding time interval if the requested transmission causes the current usage of transmission time to exceed the transmission time as proportionally allowed by the average transmission time. This has the advantage that transmission time is more evenly used also during the time interval of a bucket.

Optionally, the controller is arranged for accommodating at least one prioritized type of data transmission by decreasing the bucket budget by a prioritized data budget, and transmitting actual data of the prioritized type while correspondingly increasing the current bucket budget by the prioritized data budget. This has the advantage that special messages and prioritized data are enabled to be transmitted at any time, up to the prioritized data budget, on top of the regular traffic in the basic transmission time budget and possible peak traffic in the additional transmission time.

Optionally, the controller is arranged for accommodating a predefined function in the wireless network by adapting components of the bucket budget to the predefined function. Effectively, different devices in the wireless network can be adjusted to optimally perform respective different predefined functions. For example, the predefined function may comprise at least one of a forwarder, a data collector, a cluster head, an application terminal, or a subset of such a role.

Optionally, the controller is arranged for network layer interaction by transmitting a non-acknowledgement message instead of a requested data transmission if the requested transmission causes the current usage of transmission time to exceed the current bucket budget. Effectively, the received message that causes the non-acknowledgement message will be routed differently, or dropped, by the network. This has the advantage that such messages will not be accepted and subsequently delayed by the current device, but may be rerouted.

Optionally, the controller is arranged for accommodating network layer control comprising adapting a routing based on at least one of a history of past duty-cycle limitations;

a projection of future duty-cycle limitations;

a history of past critical states where transmissions were adapted due to requested transmissions exceeding the bucket budget.

Effectively, the network layer control is improved by taking into account the properties of the transmission capabilities of the devices in the wireless network. Such properties are derived from the past and/or future duty-cycle limitations, and/or critical states, that actually occur or can be estimated.

The device as described may be implemented in an IC or a circuit board module, which is coupled to a transmitter/receiver for accessing the network. Optionally, the device comprises a transmitter and a receiver for wireless communication in the wireless network. Also, the device may be used to control an application unit, e.g. a lighting unit in a remote location such as a lighting pole. Such an application unit may be controlled, or may receive or transmit data. Optionally, the device comprises an application unit for controlling an application and/or receiving data from the network or providing data to the network.

Optionally, the method comprises controlling the transmission of data of the device according to the current bucket budget. Also, the method may comprise detecting the transmission of data according to the duty-cycle limitation, and may be used for detecting whether transmission of data of a network device complies with the duty-cycle limitation. Furthermore, a computer program may implement the method, and may be provided on a medium such as an optical disc or memory stick.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
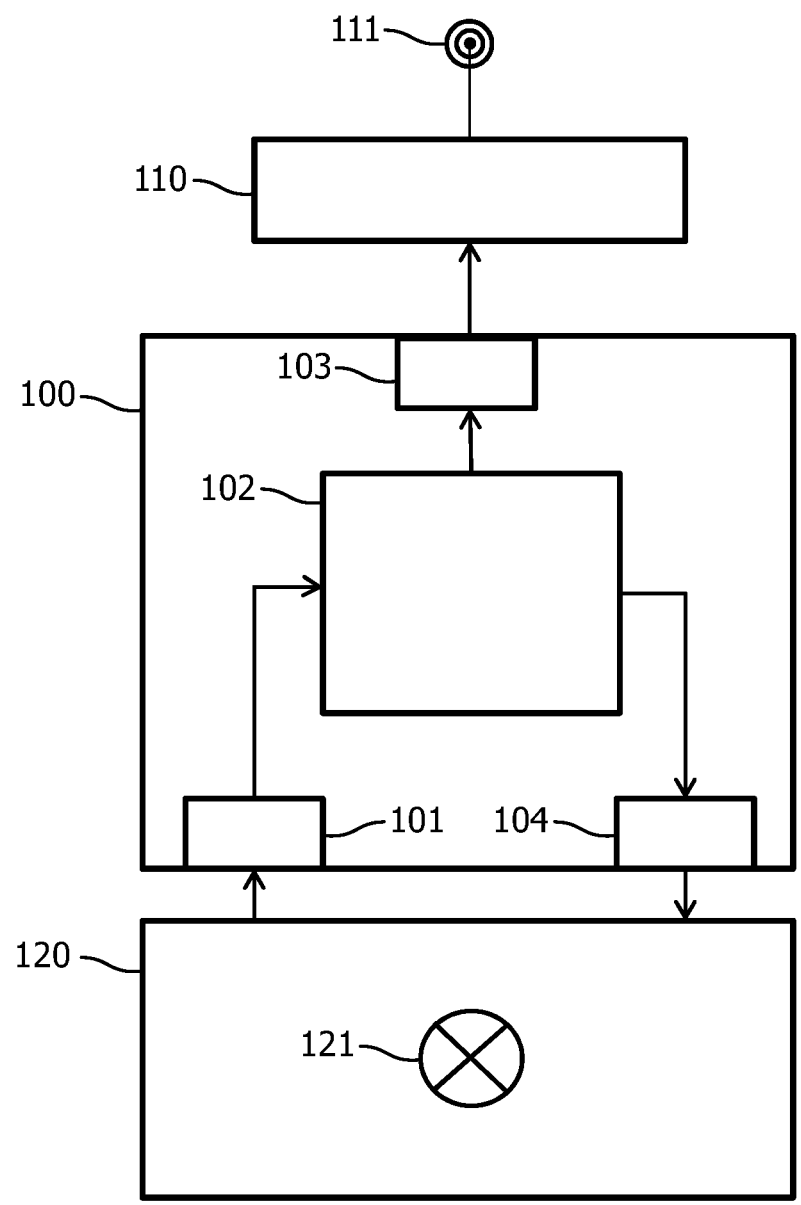
FIG. 1 shows a device for a wireless network.

FIG. 1 shows a device for a wireless network. The network has a duty-cycle limitation requiring that the device is transmitting less than a predefined fraction of a predefined duty-cycle period, for example 1% of a duty-cycle period of one hour. The fraction defines a total transmission time budget of the duty-cycle period, which in this example is 36 seconds. The fraction also defines an average transmission time for an interval in the duty-cycle period as proportionally allowed by the duty-cycle limitation in the respective time interval, for example for an interval of 60 seconds the average transmission time is 0.6 seconds.

The device 100 is coupled to a transmitter 110, which has an antenna 111 for wirelessly transmitting data to the network. The transmitter may be combined with a receiver for receiving data from the network, which data may be transferred to the device 100.

The device 100 has an input 101 for receiving data to be transferred, and an output 103 for transmitting data to the network, and may also have an output or bidirectional interface 104 to an application device or peripheral to be controlled. Furthermore, the device has a controller 102 for controlling the transmission of data according to the duty-cycle limitation.

The device 100 may be coupled to an application unit 120, for example a lighting unit having a lighting element 121. The application unit may transmit data to the input 101 and/or receive data from the interface 104 of the device, e.g. control commands for switching on or off the lighting unit.

The application may provide data about environmental conditions such as darkness, or power usage, or status reports and error messages.

Optionally, the device may be an arrangement including the transmitter 110 and/or (part of) the application unit 120, and may have further interfaces for controlling, or communicating with, other local devices, or a power supply.

The controller 102 may be implemented in hardware, for example using finite state machines of logical circuit elements, programmable hardware or a microcontroller and suitable peripheral circuits such as memory and interface logic. The controller is arranged for storing past transmission time usage of the device in a sequence of buckets. A bucket is a symbolic way to indicate a respective time interval in a sequence of consecutive, adjacent time intervals, the intervals being smaller than the duty-cycle period. The bucket contains units of transmission time, and the size of the bucket represents the available transmission time in said time interval. The available transmission time during the interval corresponding to the bucket is called a bucket budget of transmission time. Further amounts of available transmission time in an interval are also referred to as respective budgets.

Now, the duty-cycle control function of the controller, in operation, is described. The bucket budget of transmission time is determined, i.e. set for the current bucket to an initial amount by calculation as elucidated hereinbelow. The controller assigns, to the bucket budget, a basic transmission time budget smaller than the average transmission time of the corresponding time interval. Also, the controller assigns, to the current bucket budget, additional transmission time to allow for temporally exceeding the average transmission time of the respective time interval for accommodating temporal fluctuation in data transmission. The additional transmission time is determined based on the total transmission time budget and the past transmission time usage of past buckets in combination with the future basic transmission time budget of future buckets, which past, current and future buckets together cover the duty-cycle period.

A maximum of the time available for the additional time budget is a total excess time budget defined by subtracting from the total transmission time budget a sum of the basic budgets of the number of buckets in the sequence, which sequence has a length that covers the duty-cycle period. The actually available additional time may be lower if, in the past history of buckets, some additional time has been used. Hence, the sequence of buckets is analyzed in a sliding way, for example by determining all sequences having said length that contain the current budget, and calculating for each sequence the available excess budget. The calculation is based on the respective part of the past buckets containing the actual usage, and the complementary part of future buckets assigned to have the basic transmission time budget. Finally, the minimum of all such calculated available excess budgets is the available additional transmission time budget, which may be added to the current bucket. The calculation may be performed in any suitable way, e.g. by iteratively calculating the sequences. Examples of the calculation are given below.

In the examples, the buckets and time intervals are set to be equally sized. Optionally, different sizes for the buckets may also be used. Any sequence of adjacent intervals that covers the duty-cycle period must comply with the total transmission time budget.

In an embodiment, the controller is arranged for determining the additional transmission time of the current bucket, based additionally on an additional upper limit. The upper limit is set to be less than the total excess time budget as defined above. Setting the upper limit enables assigning additional transmission time to multiple buckets in a duty-cycle period, for example setting the upper limit to ⅓ of the total excess time guarantees that at least 3 buckets in any sequence can use additional transmission time.

In practice, the period is determined over which a duty cycle limit of 1% is to be endorsed; for example a period of 1 hour. During this hour it is allowed to transmit messages for a total of 36 seconds (=1% of 1 hour). This allowed transmit time can be divided into two parts:

An amount that will be equally divided over a set number of intervals (=buckets) and which is used to guarantee a certain amount of transmit time per bucket.

An amount that is used to cope with transmission peaks and that can be divided over one or more buckets.

The total guaranteed transmit budget divided by the total number of buckets will give guaranteed transmit budget per budget (i.e. the minimum bucket size). Although it is possible to use the total excess budget during the lifetime of one bucket, it is better to spread the total excess over several buckets. For this reason, a maximum bucket size is introduced. This maximum bucket size is typically 3 times the minimum bucket size and will usually be smaller than the total excess budget.

Whenever a new bucket must be used, an algorithm is used to determine how much of the total excess budget is still available for the new bucket. The algorithm uses the used transmit time of the past hour (as stored in a sequence of buckets) to determine the amount of extra transmit time that is still available for the new bucket. The resulting bucket size will be at least the minimum bucket size and at most the maximum bucket size. Below an example is given of an algorithm that may be used to determine the maximum size of the new bucket:

```
smallestMaxBucketExcess = maxBucketSize − minBucketSize
allowedBucketSum = maxExcess
usedBucketSize = 0;
for (index = (totalBuckets − 1); index > 0; index--)
{
myOldBucketIndex = (index + newBucketIndex) % totalBuckets;
usedBucketSize += Buckets [myOldBucketIndex].used_bytes;
allowedBucketSum += minBucketSize
smallestMaxBucketExcess = MIN(smallestMaxBucketExcess ,
(allowedBucketSum − usedBucketSize));
}
maxBucketSize = minBucketSize + smallestMaxBucketExcess
```

In practice, the use of RF communication is regulated depending on the region of the world and the respective wireless band. In addition to permitted applications or transmit power, also the temporal usage of a wireless band may be regulated. For example, a transmission time limitation (duty-cycle limitation) applies to the 868 MHz band in Europe, as described in the ETSI regulation "ETSI EN 300 220-1 V2.3.1 (European Standard (Telecommunications series)) Electromagnetic compatibility and Radio spectrum Matters (ERM); Short Range Devices (SRD); Radio equipment to be used in the 25 MHz to 1 000 MHz frequency range with power levels ranging up to 500 mW; Part 1: Technical characteristics and test methods, 2009-04". In this example, the duty-cycle is limited to 1%, which is a percentage indicating the maximum time the transmitter of the radio is in its transmission state, monitored over one hour.

Systems using such duty-cycle-limited bands have to ensure that this limitation is not surpassed in normal operation. In simple wireless systems where the transmission time of the device's radio interface is directly related to the need of the application on that individual device, this can be achieved by ensuring specific application behaviour. In mesh networks, however, transmission time of a device is not only determined by the need of the application installed on an individual device. In mesh networks, a device also forwards messages from other devices in the network to deliver it to a device which is not in the direct communication range of the original sender. Thus, a transmission of an individual device can cause subsequent transmissions on other devices. Limiting the inflow of messages at an application layer of individual devices does not necessarily ensure that the limitation on all devices will be adhered to.

To adhere to duty-cycle limitations by application layer means, traditional devices may share a global transmission schedule and may be time-synchronised. In addition, such a system has to have knowledge of worst case transmission time induced by any individual device on any other device. Hence, such a scheme is complex, may induce additional transmissions and is limited in flexibility, since it has to be adapted when routes in the network change. In a simple, traditional approach to duty-cycle limitation, adherence is achieved by directly limiting transmission at the transmitter by using a leaky bucket. The bucket is filled when transmitting, and leaks at a predetermined rate. As soon as the transmission time limitation is reached (i.e. the bucket is full) the device turns off the transceiver and stops the sending and forwarding of messages. In theory, such a traditional approach is the best approach a device can take locally, since the device sends as many messages as allowed and the whole mesh network and the applications should be dimensioned to induce traffic which should stay below the limitation in all areas of the network. But in practice this has major drawbacks. Due to temporal peak behaviour, temporal routing bottlenecks, faulty application behaviour, external interference or transmissions induced by third party devices (e.g. attacks), a device can reach its duty-cycle limit in a given timeframe much too early. If multiple devices have to stop their transmission for a long time, this has a major impact on the applications in the network and on the mesh routing protocol. The network (or parts of it) can temporarily not be reached, which is a serious drawback in case important messages cannot be delivered anymore. Moreover, it is also difficult to counteract faulty or exceptional behaviour, e.g. to (temporarily) deactivate applications causing the traffic peak.

A further traditional approach is to ensure that the duty-cycle limit is not applied to the whole time frame (e.g. said one hour for 868 MHz in Europe) but rather is applied on a per message basis. After each transmission, the transmitter is blocked for the relative percentage (e.g. at a fraction of $1/100$, 99× the time needed for the transmission). This ensures duty-cycle adherence but also introduces unnecessary delay since messages always have to be queued after the device has performed a transmission. Temporal peaks of messages to be forwarded cause large delays or cannot be supported (i.e. messages are dropped), although the device might have complied with its duty cycling limit in the course of an hour. So this approach has a severe impact on normal operation.

The current approach ensures that the duty-cycle limit is adhered to over a given period (e.g. one hour), and guarantees the availability of the network within a short period (e.g. maximally within one minute for a bucket time interval of one minute) and enables a varying traffic load which temporarily allows for higher transmission times.

Figure 2:
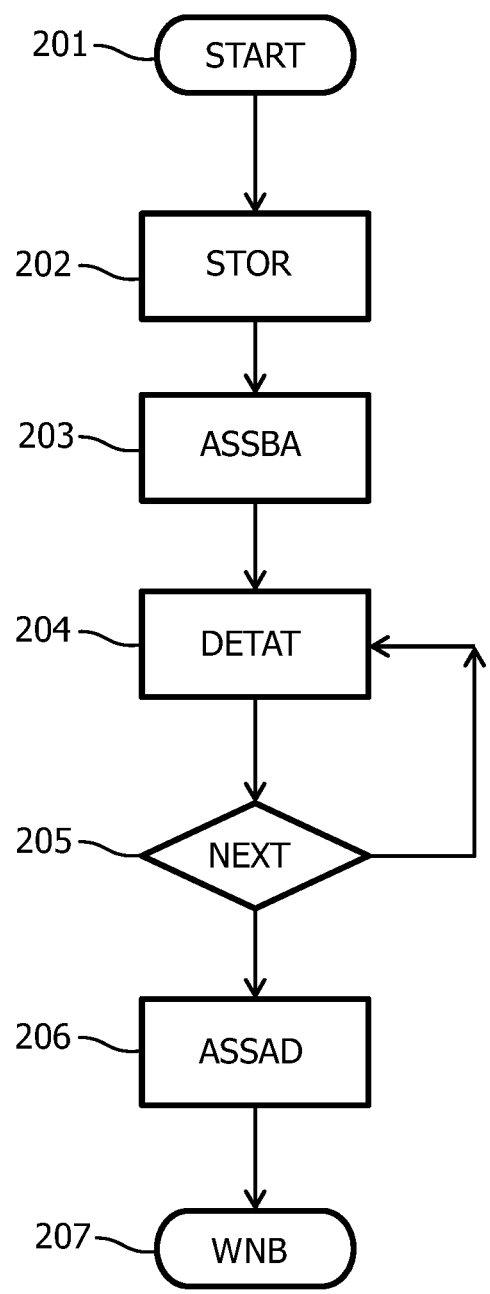
FIG. 2 shows a method of determining transmissions in a wireless network.

FIG. 2 shows a method of determining transmissions in a wireless network. The wireless network has been described hereinabove. The method starts at START 201 for determining transmission in a current time interval. The method then stores, at STOR 202, past transmission time usage of a device in the network in a sequence of buckets. In fact, if the method is applied to consecutive bucket intervals, only the most recent, preceding bucket is stored, while the oldest, no longer relevant bucket is deleted. For example, storage is implemented in a memory unit or register having a set of memory locations equal to the number of buckets, and a pointer to the most recent bucket memory location. Each bucket represents a respective time interval in a sequence of consecutive, adjacent time intervals. The intervals are smaller than the duty-cycle period, and the sequence of intervals including the current interval together cover the duty-cycle period.

Subsequently, the method determines a bucket budget of transmission time. First, at ASSBA 203, a basic transmission time budget smaller than the average transmission time of the corresponding time interval is assigned to the current bucket. An example for calculating the basic transmission time budget and further transmission time budgets is given below.

Subsequently, the method determines an additional transmission time to be added to the bucket budget of transmission time, at DETAT 204. Therefore, the total transmission time budget is decreased by the actual past usage and future possible usage of a sequence of buckets. The sequence of past, current and future buckets together covers the duty-cycle period. In a loop, controlled at NEXT 205, the remaining transmission time for each possible sequence containing the current budget is calculated by the past transmission time usage of past buckets in combination with the future basic transmission time budget of future buckets. At ASSAD 206, a minimum of all calculated remaining transmission times is determined, and an additional transmission time within said minimum is selected. Then the additional transmission time is assigned to the current bucket budget to allow for temporally exceeding the average transmission time of the respective time interval for accommodating temporal fluctuation in data transmission. Finally, the method waits for a next bucket period, at WNB 207.

The method monitors the past transmission time usage of a device in the sequence of buckets, each bucket representing a time interval smaller than the duty-cycle period. Then it assigns to each bucket the basic transmission time budget which is smaller than the transmission time budget allowed by the duty-cycle limitation. The excess budget, which is allowed transmission time minus minimal assigned transmission time added up for all buckets, is used to cover temporal fluctuation in traffic load, i.e. to allow for temporally exceeding the average transmission time given by the duty-cycle limitation. Then, the history of transmission time usage (as stored in past buckets) is used to calculate the maximum allowed transmission time of the current bucket. This ensures that the minimal transmission time is always available for every future bucket in the coming duty-cycle period. Optionally, an additional fixed upper limit, which a device should never exceed, may be applied per bucket. Also, the transmission speed may be limited, based on a maximum transmission time for the whole bucket, which ensures that transmissions are possible during the whole bucket time. Furthermore, a fraction of the maximum transmission time per bucket may be reserved for special use, e.g. for high priority messages, for MAC protocol messages, for sending acknowledgments to unicast transmissions, for Network layer [NWK] protocol messages, etc. The amount reserved might differ for different device roles (e.g. data collectors reserve more bandwidth for special use than other devices).

Figure 3:
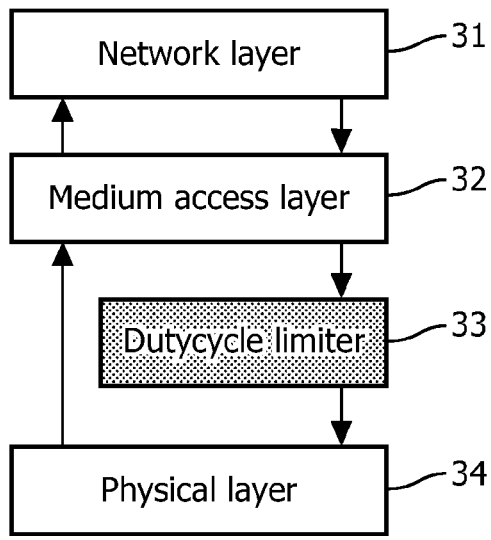
FIG. 3 shows a communication stack including a duty-cycle controller device.

FIG. 3 shows a communication stack including a duty-cycle controller device. In the communication stack, a network [NWK] layer 31 communicates with a medium access [MAC] layer 32. For incoming data, the MAC layer 32 directly communicates with a physical layer [PHY] 34, whereas for outgoing data which is to be transmitted via the physical layer, the MAC layer is coupled to a duty-cycle controller device 33, called duty-cycle limiter. The duty-cycle limiter is coupled to the physical layer and transfers the outgoing data while adhering to the duty-cycle limitation as described above.

The primary task of the duty-cycle limiter is to ensure that a device adheres to a duty-cycle limitation. The device monitors and regulates (and if necessary stops) outgoing transmissions. To achieve that, the duty-cycle limiter is located in the device's network stack. It is possible to integrate the duty-cycle limiter between physical layer and medium access layer as depicted in FIG. 3. Here, activation and deactivation of the transmitter can directly be measured and regulated. However, parts of the MAC layer are quite often realized in hardware. In this case, the interaction between MAC and PHY cannot be modified.

Figure 4:
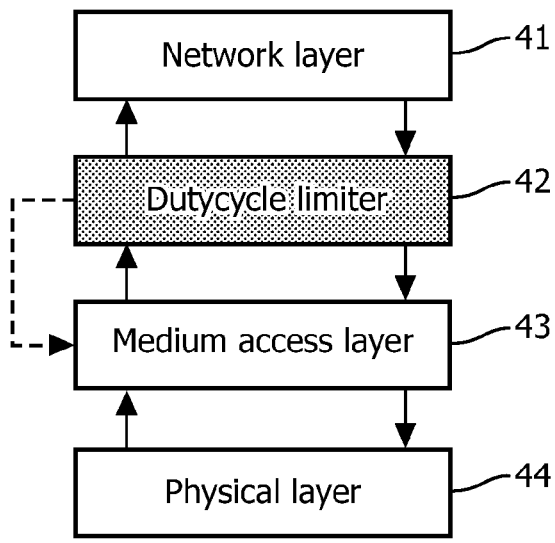
FIG. 4 shows a communication stack including a duty-cycle controller device coupled to the network layer.

FIG. 4 shows a communication stack including a duty-cycle controller device coupled to the network layer. In the Figure, the duty-cycle limiter 42 is realized between Network layer 41 and MAC layer 43, which is coupled directly to the physical layer 44. In this case, the MAC layer has to report the transmission time, or the duty-cycle limiter may estimate the transmission time, based on the messages passed from network layer to MAC layer, the messages received from the MAC layer (e.g. unicast transmissions can generate automatic transmissions of ACK messages at the MAC layer), and MAC layer behaviour under the given configuration (e.g. known or estimated number of transmitted MAC layer beacon messages). The duty-cycle limiter may control the MAC layer to deactivate any automatic transmissions if necessary.

To ensure that a device does not exceed its duty-cycle limitation, the transmissions of the device are monitored over time. Now a controller in the duty-cycle controller device keeps a history of the transmissions performed over the time period relevant for the duty-cycle limitation. In the example band, the duty-cycle period is one hour. To avoid storing all individual transmissions, this period is divided into buckets of equal length (e.g. 1 minute) and the used transmission time is added up during the time interval of the bucket.

Figure 5:
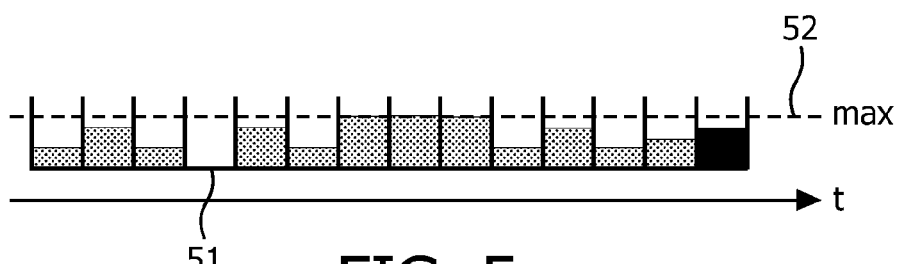
FIG. 5 shows a sequence of buckets that store transmission usage.

FIG. 5 shows a sequence of buckets that store transmission usage. In the Figure, every bucket 51 has a maximum transmission budget, which can be the same for all buckets as indicated by dashed line 52. The current bucket is the rightmost bucket, whereas the oldest bucket (e.g. an hour ago) is the leftmost bucket. If the duration of a bucket is finished a new bucket is created and the history is shifted to the left, freeing the oldest bucket. The effect of the duty-cycle controller is to calculate a maximum budget for a newly created bucket, so that the total transmission time given by the duty-cycle limitation is not exceeded in the specified period, and there is always a guaranteed minimum budget available to create a new bucket, and a budget for a bucket can exceed the allowed average bucket budget given by the duty-cycle limitation. The guaranteed basic transmission time budget ensures that it is not possible for a device to consume the total budget of the whole period within a few buckets. In other words, in a device reaching the enforced limitation, transmission is blocked at maximum for the remaining duration of the current bucket. The excess budget ensures that the duty-cycle limiter allows for temporal traffic peeks. A device can temporally exceed the allowed average budget while staying well below the allowed transmission time of the full period. The requirement ensures that this temporal peak is not unnecessarily blocked and applications are not affected.

For a practical example, the following table gives an overview of parameters and their typical values used in the traffic limiter.

| Parameter | Description | Typical value |
| --- | --- | --- |
| period_duration | Duration of the period in which the duty-cycle limitation is defined | 3600 s |
| bucket_duration | Duration of an individual bucket | 60 s |
| total_buckets, N | Total number of buckets period_duration/bucket_duration | 60 |
| dutycycle_limit | Total allowed transmission time in period of duration period_duration [=1% of period_duration] | 36 s |
| budget_maxavg | Allowed transmission time per bucket averaged over all buckets [=duty-cycle_limit/total_buckets] | 600 ms |
| budget_min | Minimal guaranteed transmission time per bucket. E.g. budget_min = 0.9 * budget_maxavg | 540 ms |
| budget_max | Maximum allowed bucket size which should never be exceeded. E.g. budget_max = 3 * budget_maxavg | 1800 ms |
| budget_excess | Budget which can be used to temporarily exceed budget_min. budget_excess = (budget_maxavg − budget_min) * total_buckets | 3600 ms |
| bucket_usage[i] | The actually used transmission time in bucket i | |
| bucket_budget | The maximum budget of the current bucket | |

Now a calculation is provided based on the above parameters. A minimal basic transmission time budget budget_min is defined which is smaller than budget_maxavg. The calculation has to ensure that budget_min is always available. The "leftover", non-guaranteed budget budget_maxavg−budget_min can be used by other buckets to exceed budget_maxavg. The sum of all "leftover" budgets, we denote as budget_excess. The calculation can use this excess to distribute it over the whole period, allowing for temporal transmission peaks. Through the calculation it is achieved that the transmission time usage history of a device is such that always a bucket of size budget_min can be created. To create a new bucket, the following must hold:

$$\text{bucket\_min} \leq \text{dutycycle\_limit} - \sum_{i=1}^{N-1} \text{bucket\_usage}[i]$$

This must also hold for the buckets to be created in the future. To have enough budget to create this and the next bucket also the following must hold:

$$2 * \text{bucket\_min} \leq \text{dutycycle\_limit} - \sum_{i=1}^{N-2} \text{bucket\_usage}[i]$$

And for the subsequent bucket:

$$3 * \text{bucket\_min} \leq \text{dutycycle\_limit} - \sum_{i=1}^{N-3} \text{bucket\_usage}[i]$$

And so forth, so in general the following has to hold:

$$n+1 * \text{bucket\_min} \leq \text{dutycycle\_limit} - \sum_{i=1}^{N-n-1} \text{bucket\_usage}[i] \; \forall \, n \in (0 \ldots N-1)$$

Since we want to allow the current bucket to exceed the limit if possible, we have to find a bucket_budget≥bucket_min for which it holds that:

$$\text{bucket\_budget} \leq \text{dutycycle\_limit} - n * \text{bucket\_min} - \sum_{i=1}^{N-n-1} \text{bucket\_usage}[i] \; \forall \, n \in (0 \ldots N-1)$$

And with dutycycle_limit=N*bucket_min+bucket_excess we get:

$$\text{bucket\_budget} \leq \text{bucket\_excess} + (N-n) * \text{bucket\_min} - \sum_{i=1}^{N-n-1} \text{bucket\_usage}[i] \; \forall \, n \in (0 \ldots N-1)$$

So the new bucket_budget can be calculated using the minimum:

$$\text{bucket\_budget} = \min_{n \in (0 \ldots N-1)} \left( \text{bucket\_excess} + (N-n) * \text{bucket\_min} - \sum_{i=1}^{N-n-1} \text{bucket\_usage}[i] \right)$$

In the following embodiments, the basic approach given above is further extended.

In a first embodiment, an additional upper limit per bucket is determined. To prevent that the current bucket uses all available bucket_excess, the bucket_budget may be further limited by a budget_max<bucket_excess. This can allow for multiple buckets in a row to exceed the bucket_min up to budget_max. For example, for enabling at least one further bucket to have additional time, the maximum may be set to $$\text{budget\_max} = \text{bucket\_excess}/2$$

In a second embodiment, a spread of the transmission load within the bucket is provided. If a device used all bucket_budget at the beginning of a new bucket, the node would have to drop all message transmissions until a new bucket was created. To prevent this, the transmission time can be spread within a bucket by regularly spreading the transmission time budget over the whole bucket. A pending message transmission is delayed when the transmission time proportionally allowed for the already passed bucket time has been used. The spreading may further take into account the preceding bucket usage if that usage is less than the basic transmission budget. Ultimately, when the bucket_budget is reached, message transmissions are either delayed into the next bucket or expire by higher layer protocols, e.g. by exceeding maximum delay of a message on a device or by queue overflow.

In a third embodiment, bandwidth is reserved for special message types and/or message priorities. For example, unicast acknowledgements at the MAC layer can be crucial for the proper working of a higher level networking protocol. Not sending an acknowledgment to the sender can cause expensive route repair mechanisms being started in a potential overload situation when it would be better to directly drop the message. Also other MAC protocol messages (e.g. beacons) and NWK protocol messages might be too crucial for the whole system to be dropped too early. Hence, protocol messages are prioritized over data messages and a fraction of the bucket_budget is reserved for such transmissions. This may be beneficial for the overall system behaviour under high load, but will cause data messages to be dropped earlier in the high load situation in favor of (potentially upcoming) protocol transmissions. Also high priority data messages may be handled in a prioritized way over other data messages. Hence, the bucket may be provided with one or more additional thresholds to decide whether to transmit a prioritized message or not:

$$\text{prio1\_msg\_budget} \leq \ldots \leq \text{prioN\_msg\_budget} = \text{bucket\_budget}$$

Examples for high priority messages are messages needed to investigate or counteract an overload situation e.g. deactivate/pause applications or messages crucial for the system e.g. emergency lamp override in outdoor lighting systems to dim-up light in case of an emergency.

In a further embodiment, a device role is used to set the traffic limitation behavior. In a mesh network, devices can have different roles (e.g. forwarders, data collectors, cluster heads, normal devices). Depending on the role, also the behaviour of the duty-cycle limiter can be adapted. For example, a data collector has a higher need to guarantee transmission of unicast acknowledgments, since it receives more data messages than it sends. Devices relevant for the mesh network routing protocols (e.g. forwarders, cluster heads but also data collectors) have a higher need for transmitting network protocol messages, to avoid that (parts of) the network breaks down when the device has to stop sending traffic.

In a further embodiment, a device uses unicast NACK messages at the MAC-layer for NWK-layer interaction. Instead of sending a unicast acknowledgment at the MAC layer as mentioned above in the third embodiment, the MAC can alternatively send a NACK if no data transmissions are allowed at the moment. This allows the NWK-layer of the sending device to decide how to proceed with the message, for example as follows:

a) If the message's NWK-layer destination is the device sending the NACK, it can be dropped;
b) If the device has an alternative route to the message's NWK-layer destination, it can try to use the alternative route;
c) If the device has no alternative route to the message's NWK-layer destination, it is likely better to drop the message instead of repairing the route or discovering a new route. This may depend on the routing protocol at the NWK-layer.

Also, the device sending the NACK has to drop the received message at the NWK-layer if it is not addressed to this device.

In a further embodiment, traffic-limitation-aware routing is accommodated. A detailed history of the duty-cycle limitation, projection of possible limitations in the future and/or the critical states can be used at the NWK-layer to influence and update the routing metric and thus also the routes. The detailed history can be analyzed in a similar way to the algorithm described above. The critical states occur when bucket limits are exceeded for prioritized or special data messages as described above.

Although the invention has been mainly explained by embodiments using the 868 Mhz band as regulated by ETSI, the invention is also suitable for any wireless network that has a duty-cycle limitation.

It is to be noted that the invention may be implemented in hardware and/or software, using programmable components.

It will be appreciated that, for clarity, the above description has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. Device for a wireless network, the network having a duty-cycle limitation requiring that the device is transmitting less than a predefined fraction of a predefined duty-cycle period, which fraction defines a total transmission time budget of the duty-cycle period and an average transmission time for an interval in the duty-cycle period as proportionally allowed by the duty-cycle limitation in the respective time interval, the device comprising:
   an input for receiving data to be transferred,
   an output for transmitting data to the network,
   a controller for controlling the transmission of data according to the duty-cycle limitation, the controller being arranged for:
      storing past transmission time usage of the device in a sequence of buckets, each bucket representing a respective time interval in a sequence of consecutive, adjacent time intervals, the intervals being smaller than the duty-cycle period, and
      determining a bucket budget of transmission time by assigning to the bucket budget a basic transmission time budget smaller than the average transmission time of the corresponding time interval, and
      assigning an additional transmission time to a current bucket budget to allow for temporally exceeding the average transmission time of the respective time interval for accommodating temporal fluctuation in data transmission and determining the additional transmission time, based on the total transmission time budget and the past transmission time usage of past buckets in combination with the future basic transmission time budget of future buckets by
      analyzing further sequences of buckets in a sliding way, the further sequences comprising past, current and future buckets together having a length covering the duty-cycle period, and calculating for each sequence an available excess budget based on the respective part of the further sequence being past buckets containing the actual usage and the complementary part of the further sequence being future buckets assigned to have the basic transmission time budget and taking the minimum of the calculated available excess budgets as the additional transmission time,
   wherein the controller is arranged for network layer interaction by transmitting a non-acknowledgement message instead of a requested data transmission if the requested transmission causes the current usage of transmission time to exceed the current bucket budget.

2. Device as claimed in claim 1, wherein the controller is arranged for accommodating a predefined function in the wireless network by adapting components of the bucket budget to the predefined function.

3. Device as claimed in claim 2, wherein the predefined function comprises at least one of a forwarder, a data collector, a cluster head, an application terminal.

4. Device as claimed in claim 1, wherein the controller is arranged for determining the additional transmission time of the current bucket, based additionally on an additional upper limit, the upper limit being less than a total excess time budget defined by subtracting from the total transmission time budget a sum of the basic budgets of the number of buckets in the sequence, which sequence covers the duty-cycle period, the upper limit enabling assigning additional transmission time to multiple buckets in a duty-cycle period.

5. Device as claimed in claim 1, wherein the controller is arranged for spreading the transmission within the current bucket by delaying a requested transmission within the corresponding time interval if the requested transmission causes the current usage of transmission time to exceed the transmission time as proportionally allowed by the average transmission time.

6. Device as claimed in claim 1, wherein the controller is arranged for accommodating at least one prioritized type of data transmission by decreasing the bucket budget by a prioritized data budget, and transmitting actual data of the prioritized type while correspondingly increasing the current bucket budget by the prioritized data budget.

7. Device as claimed in claim 1, wherein the device comprises a transmitter for wireless communication in the wireless network.

8. Device as claimed in claim 1, wherein the device comprises an application unit for controlling an application and/or receiving data from the network or providing data to the network.

9. Method of determining transmissions in a wireless network, the network having a duty-cycle limitation requiring that the device is transmitting less than a predefined fraction of a predefined duty-cycle period, which fraction defines a total transmission time budget of the duty-cycle period and an average transmission time for an interval in the duty-cycle period as proportionally allowed by the duty-cycle limitation in the respective time interval; the method comprising:
   storing past transmission time usage of a device in the network in a sequence of buckets, each bucket representing a respective time interval in a sequence of consecutive, adjacent time intervals, the intervals being smaller than the duty-cycle period, and determining a bucket budget of transmission time by assigning to the bucket budget a basic transmission time budget smaller than the average transmission time of the corresponding time interval, and assigning additional transmission time to a current bucket budget to allow for temporally exceeding the average transmission time of the respective time interval for accommodating temporal fluctuation in data transmission and determining (204) the additional transmission time, based on the total transmission time budget and the past transmission time usage of past buckets in combination with the future basic transmission time budget of future buckets by analyzing further sequences of buckets in a sliding way, the further sequences comprising past, current and future buckets together having a length covering the duty-cycle period, and calculating for each sequence an available excess budget based on the respective part of the further sequence being past buckets containing the actual usage and the complementary part of the further sequence being future buckets assigned to have the basic transmission time budget and taking the minimum of the calculated available excess budgets as the additional transmission time, and transmitting a non-acknowledgement message instead of a requested data transmission if the requested transmission causes the current usage of transmission time to exceed the current bucket budget.

10. Method as claimed in claim 9, wherein the method comprises controlling the transmission of data of the device according to the current bucket budget.

11. Method as claimed in claim 9, wherein the current bucket budget is determined by $$\text{bucket\_budget} = \min_{n \in (0...N-1)} \left( \text{bucket\_excess} + (N-n)*\text{bucket\_min} - \sum_{i=1}^{N-n-1} \text{bucket\_usage}[i] \right)$$

N being a total number of buckets in the duty-cycle period;

bucket_min being the basic transmission time budget;

bucket_usage[i] being the transmission time usage during bucket I;

bucket_excess being a budget which can be used to temporarily exceed bucket_min.

12. Computer program product, stored in a non-transitory computer readable medium, for determining transmissions in a wireless network, which program is operative to cause a processor to perform the method as claimed in claim 9.

13. Device for a wireless network, the network having a duty-cycle limitation requiring that the device is transmitting less than a predefined fraction of a predefined duty-cycle period, which fraction defines a total transmission time budget of the duty-cycle period and an average transmission time for an interval in the duty-cycle period as proportionally allowed by the duty-cycle limitation in the respective time interval, the device comprising:

an input for receiving data to be transferred, an output for transmitting data to the network, a controller for controlling the transmission of data according to the duty-cycle limitation, the controller being arranged for:

storing past transmission time usage of the device in a sequence of buckets, each bucket representing a respective time interval in a sequence of consecutive, adjacent time intervals, the intervals being smaller than the duty-cycle period, and determining a bucket budget of transmission time by assigning to the bucket budget a basic transmission time budget smaller than the average transmission time of the corresponding time interval, and assigning an additional transmission time to a current bucket budget to allow for temporally exceeding the average transmission time of the respective time interval for accommodating temporal fluctuation in data transmission and determining the additional transmission time, based on the total transmission time budget and the past transmission time usage of past buckets in combination with the future basic transmission time budget of future buckets by analyzing further sequences of buckets in a sliding way, the further sequences comprising past, current and future buckets together having a length covering the duty-cycle period, and calculating for each sequence an available excess budget based on the respective part of the further sequence being past buckets containing the actual usage and the complementary part of the further sequence being future buckets assigned to have the basic transmission time budget and taking the minimum of the calculated available excess budgets as the additional transmission time, wherein the controller is arranged for accommodating network layer control comprising adapting a routing based on at least one of:

a history of past duty-cycle limitations;

a projection of future duty-cycle limitations;

a history of past critical states where transmissions were adapted due to requested transmissions exceeding the bucket budget.

14. Method of determining transmissions in a wireless network, the network having a duty-cycle limitation requiring that the device is transmitting less than a predefined fraction of a predefined duty-cycle period, which fraction defines a total transmission time budget of the duty-cycle period and an average transmission time for an interval in the duty-cycle period as proportionally allowed by the duty-cycle limitation in the respective time interval; the method comprising:

storing past transmission time usage of a device in the network in a sequence of buckets, each bucket representing a respective time interval in a sequence of consecutive, adjacent time intervals, the intervals being smaller than the duty-cycle period, and determining a bucket budget of transmission time by assigning to the bucket budget a basic transmission time budget smaller than the average transmission time of the corresponding time interval, and assigning additional transmission time to a current bucket budget to allow for temporally exceeding the average transmission time of the respective time interval for accommodating temporal fluctuation in data transmission and determining (204) the additional transmission time, based on the total transmission time budget and the past transmission time usage of past buckets in combination with the future basic transmission time budget of future buckets by analyzing further sequences of buckets in a sliding way, the further sequences comprising past, current and future buckets together having a length covering the duty-cycle period, and calculating for each sequence an available excess budget based on the respective part of the further sequence being past buckets containing the actual usage and the complementary part of the further sequence being future buckets assigned to have the basic transmission time budget and taking the minimum of the calculated available excess budgets as the additional transmission time,
wherein the controller is further arranged to determine the current bucket budget by $$bucket\_budget = \min_{n \in (0...N-1)} \left( bucket\_excess + (N-n) * bucket\_min - \sum_{i=1}^{N-n-1} bucket\_usage[i] \right)$$

N being a total number of buckets in the duty-cycle period;
bucket_min being the basic transmission time budget;
bucket_usage[i] being the transmission time usage during bucket I;
bucket_excess being a budget which can be used to temporarily exceed bucket_min.

15. Method of determining transmissions in a wireless network, the network having a duty-cycle limitation requiring that the device is transmitting less than a predefined fraction of a predefined duty-cycle period, which fraction defines a total transmission time budget of the duty-cycle period and an average transmission time for an interval in the duty-cycle period as proportionally allowed by the duty-cycle limitation in the respective time interval; the method comprising:
  storing past transmission time usage of a device in the network in a sequence of buckets, each bucket representing a respective time interval in a sequence of consecutive, adjacent time intervals, the intervals being smaller than the duty-cycle period, and
  determining a bucket budget of transmission time by
  assigning to the bucket budget a basic transmission time budget smaller than the average transmission time of the corresponding time interval, and
  assigning additional transmission time to a current bucket budget to allow for temporally exceeding the average transmission time of the respective time interval for accommodating temporal fluctuation in data transmission and determining (204) the additional transmission time, based on the total transmission time budget and the past transmission time usage of past buckets in combination with the future basic transmission time budget of future buckets by
  analyzing further sequences of buckets in a sliding way, the further sequences comprising past, current and future buckets together having a length covering the duty-cycle period, and calculating for each sequence an available excess budget based on the respective part of the further sequence being past buckets containing the actual usage and the complementary part of the further sequence being future buckets assigned to have the basic transmission time budget and taking the minimum of the calculated available excess budgets as the additional transmission time, and
adapting a routing based on at least one of:
  a history of past duty-cycle limitations;
  a projection of future duty-cycle limitations;
  a history of past critical states where transmissions were adapted due to requested transmissions exceeding the bucket budget.

* * * * *